United States Patent Office 3,147,282
Patented Sept. 1, 1964

3,147,282
PREPARATION OF GRISEOFULVIN AND ANALOGUES THEREOF
Harry L. Slates, Florham Park, and Norman L. Wendler, Summit, N.J., assignors to Merck & Co., Inc., Rahway, N.J., a corporation of New Jersey
No Drawing. Filed Oct. 19, 1961, Ser. No. 145,034
6 Claims. (Cl. 260—346.2)

This invention relates generally to the preparation of chemical compounds. More particularly, it relates to a new and novel synthesis of griseofulvin and related compounds. Still more specifically, it is concerned with the synthesis of griseofulvin and analogs thereof from the corresponding dehydro compounds.

This application is a continuation-in-part of our application Serial No. 70,912, filed November 22, 1960, now U.S. Patent No. 3,113,970.

Griseofulvin is a well-known antifungal agent having the structural formula

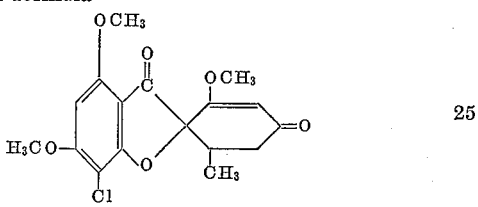

It is an antifungal agent effective when administered orally in the treatment of various systemic fungus infections. Heretofore, griseofulvin has been produced microbiologically by certain strains of Penicillia. Meanwhile, efforts have continued to synthesize the complex griseofulvin molecule chemically since a feasible chemical synthesis would permit the study of improved methods of making griseofulvin and would further permit the preparation of griseofulvin analogs and derivatives that are not accessible by fermentation.

It has now been found that griseofulvin and analogs thereof may be synthesized chemically by a relatively short and feasible process employing as the starting materials an appropriately substituted phenol and an appropriately substituted benzoyl halide. This process may be pictured structurally as follows:

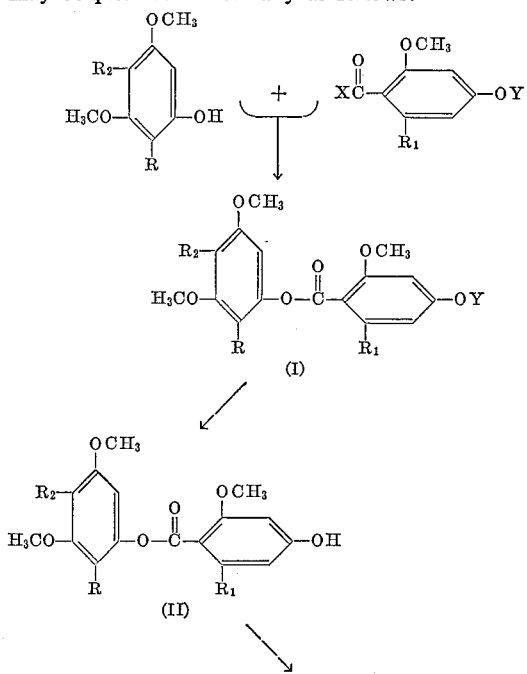

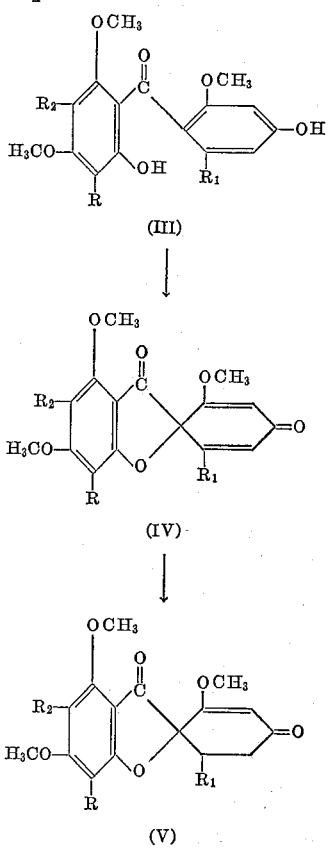

In the above formulas, R and $R_2$ are hydrogen or halogen and may be the same or different in a specific compound, $R_1$ is hydrogen or a lower alkyl group, X is chlorine or bromine, and Y is a lower alkanoyl radical.

As set forth in the flow diagram, it has been found that 2,4-dihydroxy - 3 - R - 4,6,2′-trimethoxy-5-$R_2$-6′-$R_1$-benzophenone (Compound III above), an important intermediate in the overall synthesis, may be obtained by reacting together 2-$R_1$-4-acetoxy-6-methoxybenzoyl chloride and 2-R-4-$R_2$-3,5-dimethoxyphenol to produce 2-R-4-$R_2$-3,5-dimethoxyphenyl 2-$R_1$-4-aetoxy-6-methoxybenzoate (Compound I), treating this latter compound with a base under mild conditions to form 2-R-4-$R_2$-3,5-dimethoxyphenyl 2 - $R_1$ - 4 - hydroxy - 6 - methoxybenzoate (Compound II), and then exposing this last-mentioned substance to ultra-violet light whereby the benzophenone III is produced. In the above compounds R, $R_1$ and $R_2$ have the meanings set forth previously.

The 2,4′ - dihydroxy - 3 - R - 4,6,2′ - trimethoxy - 5 -$R_2$-6″-$R_1$-benzophenone (III) formed as described above is converted on treatment with potassium ferricyanide in aqueous potassium carbonate to racemic 7-R-4,6,2′-trimethoxy - 5 - $R_2$ - 6′ - $R_1$ - gris - 2′5′ - diene - 3,4′ - dione (Compound IV), where R, $R_1$ and $R_2$ are as defined above. The nomenclature used for describing Compounds IV and V is that recommended by Grove et al., J. Chem. Soc. 3977 (1952). There may be obtained in this fashion racemic forms of 7 - chloro - 4,6,2′ - trimethoxy - 6′ - methyl - gris - 2′,5′-diene-3,4′-dione (dehydrogriseofulvin);
7 - fluoro - 4,6,2′ - trimethoxy - 6′ - methyl - gris - 2′,5′-diene-3,4′-dione;
4,6,2′ - trimethoxy - 6′ - methyl - gris - 2′,5′ - diene - 3,4′-dione;

7 - chloro - 4,6,2' - trimethoxy - gris - 2',5' - diene - 3,4'-dione;

7 - chloro - 4,6,2' - trimethoxy - 6' - ethyl - gris - 2',5'-diene-3,4'-dione;

7 - chloro - 4,6,2' - trimethoxy - 6' - propyl - gris - 2',5'-diene-3,4'-dione;

5 - fluoro - 4,6,2' - trimethoxy - 6' - methyl - gris - 2',5'-diene3,4'-dione;

5 - chloro - 4,6,2' - trimethoxy - 6' - methyl - gris - 2',5'-diene-3,4'-dione;

5,7 - dichloro - 4,6,2' - trimethoxy - 6' - methyl - gris - 2',5'-diene-3,4'-dione;

5 - fluoro - 7 - chloro - 4,6,2' - trimethoxy - 6' - methyl-gris-2',5'-diene-3,4'-dione;

and similar compounds wherein the 7- and 5-positions may be substituted with hydrogen or halogen, and the 6'-substituent may be hydrogen or a lower alkyl group.

One of the difficulties encountered in the attempts at a total chemical synthesis of griseofulvin and analogs thereof has been the reduction of one of the double bonds in the diene IV. Successful reduction of the proper double bonds would afford racemic griseofulvin (Compound V, R=Cl, $R_1$=$CH_3$, $R_2$=H) and racemic analogs of griseofulvin. The one reported method of effecting this reduction suffers the disadvantage of requiring an unusual and expensive catalyst. It is one object of the present invention to provide a convenient and practical method of bringing about this reduction. A more specific object is provision of a method which gives high yields of the desired compound without the necessity of using expensive and unusual reducing agents. Other objects will be apparent from the following description of our invention.

We have now discovered, according to the present invention, that 7 - R - 4,6,2'-trimethoxy-5-$R_2$-6'-$R_1$-gris-2,5'-diene-3,4'-dione may be reduced in substantial yield to the desired 7-R-4,6,2'-trimethoxy-5-$R_2$-6'-R-gris-2'-ene-3,4'-dione (Compound V) by treatment with hydrogen in the presence of a palladium catalyst and in a non-hydroxylic solvent medium.

We accomplish our catalytic reduction by bringing together a solution of the diene (IV) in a suitable non-hydroxylic organic solvent, such as ethyl acetate, ethyleneglycol dimethyl ether, tetrahydrofuran, dioxane, benzene, toluene and the like, and a palladium catalyst, and exposing this reaction mixture to hydrogen. The hydrogenation is conveniently carried out at about room temperature and substantially at atmospheric pressure. It will be appreciated that the reaction may be conducted at higher temperatures or under a slight positive pressure, but these conditions are unnecessary for good yield. As catalyst it is preferred to employ palladium on charcoal, although other catalyst carriers could be utilized if desired. With respect to the quantity of catalyst, we prefer to use an amount of palladium equal to about 5–25% by weight of the diene (IV), although good results are obtained with smaller or larger quantities.

The hydrogenation is allowed to continue until one mole of hydrogen is consumed per mole of diene IV. This occurs rapidly although the rate depends to some extent on the amount of catalyst that is present. When the reaction is complete the desired product (V) may be conveniently recovered by removing the catalyst and reaction solvent, and purifying the material by techniques such as chromatography. The methods preferred for recovering the desired substances from the reaction mixture will depend, of course, on factors such as the degree of purification required, the amount of material involved and the like.

Although it might be expected that either hydrogenolysis or complete reduction of the 7-R-4,6,2'-trimethoxy-6'-$R_1$-gris-2,5'-diene-3,4'-dione (IV) would occur instead of the desired hydrogenation, we have found that the major reaction product is the 7-R-4,6,2'-trimethoxy-5-$R_2$-6'-$R_1$-gris-2-ene-3,4'-dione of Formula V above, and that only minor amounts of either the hydrogenolytic product, i.e. the benzophenone derivative (III), or the more highly saturated derivative are obtained.

Utilizing the catalytic reduction process described above, there may be produced the racemic form of griseofulvin (Compound V, R=Cl, $R_1$=$CH_3$) and racemates of griseofulvin analogs such as 7-fluoro-4,6,2'-trimethoxy - 6' - methyl-gris-2'-ene-3,4'-dione (V, R=F, $R_1$=$CH_3$), 7-chloro - 4,6,2' - trimethoxy-6'-ethyl-gris-2'-ene-3,4'-dione (V, R=Cl, $R_1$=$C_2H_5$) and 4,6,2'-trimethoxy-gris-2'-ene-3,4'-dione (V, R=$R_1$=H).

The following examples are given for the purpose of illustration and not by way of limitation:

EXAMPLE 1

A. *2-chloro-3,5-dimethoxyphenyl 2-methyl-4-acetoxy-6-methoxybenzoate.*—A solution of 800 mg. of 2-methyl-4-acetoxy-6-methoxybenzoic acid in 20 ml. of thionyl chloride is kept at 50° C. for 2 hours. The reaction mixture is concentrated to dryness under vacuum to give a residue of 2-methyl-4-acetoxy-6-methoxybenzoyl chloride. To this product is added 626 mg. of 2-chloro-3,5-dimethoxyphenol and 11 ml. of pyridine. The mixture is warmed on the steam bath for 2 minutes and then kept at 25° C. for 18 hours. Chloroform is then added and the mixture extracted with cold dilute hydrochloric acid, cold dilute sodium hydroxide solution and saturated sodium chloride solution. The chloroform solution is dried over magnesium sulfate, filtered and then concentrated to dryness under vacuum. Crystallization of the resulting residue from ether gives 880 mg. of 2-chloro-3,5-dimethoxyphenyl 2-methyl-4-acetoxy-6-methoxybenzoate, M.P. 152–155° C.

$\lambda_{max.}^{MeOH}$ 281 m$\mu$ ($\epsilon$, 4150); $\lambda_{max.}^{Chf.}$ 5.75, 5.80$\mu$ B. *2-chloro-3,5-dimethoxyphenyl 2-methyl-4-hydroxy-6-methoxybenzoate.*—A solution of 870 mg. of 2-chloro-3,5-dimethoxyphenyl 2-methyl-4-acetoxy-6-methoxybenzoate in 60 ml. of methanol and 40 ml. of aqueous 10% sodium hydroxide is kept at 25° C. for 4 hours. The methanol is then removed under vacuum and the reaction mixture is extracted with chlorform. The aqueous phase is acidified with dilute hydrochloric acid, extracted with chloroform and the chloroform extract washed with salt solution and dried over magnesium sulfate. It is filtered to remove the drying agent and concentrated to dryness under vacuum. The residue is crystallized to give 615 mg. of 2-chloro-3,5-dimethoxyphenyl 2-methyl-4-hydroxy-6-methoxybenzoate, M.P. 142–144° C.

$\lambda_{max.}^{MeOH}$ 283 m$\mu$ ($\epsilon$, 5700), 261 m$\mu$ ($\epsilon$,6800);

$\lambda_{max.}^{Chf.}$ 2.76, 3.00, 5.74$\mu$

EXAMPLE 2

*2,4'-Dihydroxy-3-Chloro-4,6,2'-Trimethoxy-6'-Methylbenzophenone*

A solution of 100 mg. of 2-chloro-3,5-dimethoxyphenyl 2-methyl-4-hydroxy-6-methoxybenzoate in 2.5 ml. of ethanol in a quartz tube is irradiated with ultra-violet light (Hanovia Type 16A13 broad spectrum low pressure light source) at 40° C. for 66 hours. The solvent is removed and the residue chromatographed on a column of 20 g. of Florisil. The column is eluted successively with benzene, benzene-chloroform, chloroform and chloroform-methanol mixtures. Crystallization of the residues obtained from the chloroform:5–10% methanol eluates from ethyl ether gives 2,4'-dihydroxy-3-chloro-4,6,2'-trimethoxy-6'-methylbenzophenone, M.P. 212.5–215° C.

EXAMPLE 3

*Dehydrogriseofulvin*

To a stirred solution of 2.25 g. of 2,4'-dihydroxy-4,6,2'-trimethoxy-6'-methyl-3-chloro-benzophenone and 27 g. of potassium carbonate in 250 ml. of boiled nitrogen-flushed distilled water is added a solution of 4.0 g. of potassium ferricyanide in 50 ml. of water. The addition is carried out in a nitrogen atmosphere over a period of 1 hour. The reaction mixture is stirred at room temperature under nitrogen for 18 hours. The precipitated material is recovered by filtration and air dried. It is dissolved in chloroform and the solution filtered. The chloroform is diluted with about an equal volume of ether and washed with ice-cold 2% potassium hydroxide solution and with water. The organic solvent solution is dried over magnesium sulfate, filtered and concentrated to dryness in vacuo. The residue is crystallized from acetone-ethyl acetate to afford substantially pure racemic dehydrogriseofulvin, M.P. 284–286° C.;

$\lambda$ max. 292 m$\mu$ ($\epsilon$, 32,000), infl. 230 m$\mu$ ($\epsilon$, 22,000), infl. 318 ($\epsilon$, 5,900).

Further purification by passage through a Florisil column raises the melting point to 291–293° C.

EXAMPLE 4

Griseofulvin 500 mg. of racemic dehydrogriseofulvin in 110 ml. of ethyl acetate is added to a stirred suspension of 1.0 g. of pre-reduced 10% palladium on charcoal catalyst and hydrogenated at atmospheric pressure and 22° C. When 1.0 mole of hydrogen is absorbed (occurs rapidly) the catalyst is removed by filtration and the filtrate concentrated in vacuo to a viscous pale yellow oil. This oil is dissolved in 50 ml. of methylene chloride and the solution washed with 3 x 10 ml. of ice-cold 2% potassium hydroxide, water, and dried over magnesium sulfate. The methylene chloride solution is filtered and concentrated to dryness in vacuo. The solid residue thus obtained is dissolved in 15 ml. of benzene and chromatographed on a column of 15 g. of Florisil. The column is eluted with 15-ml. portions of benzene, benzene-chloroform mixtures and finally with chloroform. From the chloroform eluates two products are obtained, one with M.P. 213–215° C. (11.5% yield) and the second with M.P. 222–224° C. (51% yield). Characterization is by in vivo bio-assay by the disc-plate method with *Botrytis allii* as the test organism.

The material melting at 222–224° C. is racemic griseofulvin. It has 50% of the activity of natural griseofulvin.

EXAMPLE 5

2-Chloro-3,5-Dimethoxyphenyl 4-Hydroxy-6-Methoxybenzoate

A. 1 g. of 4-acetoxy-2-methoxybenzoic acid is added to 20 g. of thionyl chloride and the resulting mixture held at 50° C. for 130 minutes. The reaction mixture is then concentrated to dryness to give a residue of 4-acetoxy-2-methoxybenzoyl chloride. This material is mixed with 15 ml. of pyridine and 720 mg. of 2-chloro-3,5-dimethoxyphenol. The reaction mixture is heated at about 90° C. for 2 minutes and then held at room temperature for 12 hours. Chloroform is then added to the solution and 2-chloro-3,5-dimethoxyphenyl 4-acetoxy-6-methoxybenzoate recovered and crystallized by the procedure described in Example 1A.

The benzoate ester is treated with aqueous methanolic sodium hydroxide at room temperature by the process of Example 1B. There is thus obtained 2-chloro-3,5-dimethoxyphenyl 4-hydroxy-6-methoxybenzoate, M.P. 147–150° C.;

$\lambda_{max.}^{Chf.}$ 3.05, 5.88$\mu$

B. The acid chloride of 2-methyl-4-acetoxy-6-methoxybenzoic acid is prepared from the free acid as described in Examples 1A and 5A, and reacted with phloroglucinol dimethyl ether by the procedure of Example 1A to give 3,5-dimethoxyphenyl 2-methyl-4-acetoxy-6-methoxybenzoate. This ester is hydrolyzed to 3,5-dimethoxyphenyl 2-methyl-4-hydroxy-6-methoxybenzoate with methanolic sodium hydroxide according to the procedures of Examples 1B and 5A.

EXAMPLE 6

2,4'-Dihydroxy-3-Chloro-4,6,2'-Trimethoxybenzophenone

A. 200 mg. of 2-chloro-3,5-dimethoxyphenyl 4-hydroxy-6-methoxybenzoate in 5 ml. of ethanol in a quartz tube is irradiated with ultra-violet light (Hanovia Type 16A13 broad spectrum low pressure light source) at 40° C. for 58 hours. The resulting reaction mixture is treated by the recovery procedure of Example 2 to give 2,4'-dihydroxy-3-chloro-4,6,2'-trimethoxybenzophenone.

B. When the above procedure is carried out using 3,5-dimethoxyphenyl 2-methyl-4-hydroxy-6-methoxybenzoate as starting material, there is obtained 2,4'-dihydroxy-4,6,2'-trimethoxy-6'-methylbenzophenone, M.P. 180–182° C.

EXAMPLE 7

7-Chloro-4,6,2'-Trimethoxy-Gris-2',5'-Diene-3,4'-Dione

A. 2.2 g. of 2,4'-dihydroxy-3-chloro-4,6,2'-trimethoxybenzophenone is treated with 27 g. of potassium carbonate and 4 g. of potassium ferricyanide under nitrogen by the method of Example 3. There is obtained substantially pure racemic 7-chloro-4,6,2'-trimethoxy-gris-2',5'-diene-3,4'-dione.

B. When the procedure of Example 3 is carried out employing 2,4' - dihydroxy - 4,6,2'-trimethoxy-6'-methylbenzophenone as the starting material, there is obtained racemic 4,6,2' - trimethoxy-6'-methyl-gris-2',5'-diene-3,4'-dione, M.P. 241–244° C.

EXAMPLE 8

7-Chloro-4,6,2'-Trimethoxy-Gris-2'-Ene-3,4'-Dione

A. When the product of Example 7A is treated with hydrogen in the presence of palladium on charcoal catalyst according to the procedure of Example 4, there is obtained from the chloroform eluates racemic 7-chloro-4,6,2'-trimethoxy-gris-2'-ene-3,4'-dione.

B. When racemic 4,6,2'-trimethoxy-6'-methyl-gris-2',5'-diene-3,4'-dione is hydrogenated according to the procedure of Example 4, there is obtained racemic 4,6,2'-trimethoxy-6'-methyl-gris-2'-ene -3,4' - dione, M.P. 218–219° C.

EXAMPLE 9

7-Fluoro-4,6,2'-Trimethoxy-6'-Methyl-Gris-2'-Ene-3,4'-Dione

A. 50 g. of the benzyl ether of 2-amino-3,5-dimethoxyphenol is added to 100 ml. of methanol and 3 g. of 5% palladium on charcoal. The solution is treated with hydrogen until about 1 mole of hydrogen is consumed. It is then filtered and concentrated to dryness in vacuo to give a residue of 2-amino-3,5-dimethoxyphenol.

20 g. of this phenol in 40 ml. of hydrochloric acid is mixed with 15 g. of sodium nitrite in 25 ml. of water. To the resulting solution is added 60 ml. of 40% fluoboric acid. A diazonium fluoborate salt precipitates and is recovered by filtration. It is washed with fluoboric acid and then successively with ethyl alcohol and ether. It is then dried in vacuo. On warming, the product decomposes to give 2-fluoro-3,5-dimethoxyphenol which may be purified by distillation in vacuo.

B. 2 - fluoro-3,5-dimethoxyphenyl 2-methyl-4-acetoxy-6-methoxybenzoate is obtained by reacting together the acid chloride of 2-methyl-4-acetoxy-6-methoxybenzoic acid and 2-fluoro-3,5-dimethoxyphenol according to the procedure of Example 1A. This later compound is hydrolyzed to 2-fluoro-3,5-dimethoxyphenyl 2-methyl-4-hydroxy-6-methoxybenzoate according to the method of Example 1B.

When 2 - fluoro - 3,5-dimethoxyphenyl 2-methyl-4-hydroxy-6-methoxybenzoate is irradiated with ultra-violet light according to the process described in Example 2, there is obtained 2,4'-dihydroxy-3-fluoro-4,6,2'-trimethoxy-6'-methylbenzophenone, M.P. 186–190° C.; 200–203° C. (double melting point).

To a solution of 700 mg. of 2,4'-dihydroxy-3-fluoro-4,6,2'-trimethoxy-6'-methylbenzophenone in 20 ml. of tertiary butanol there is added a solution of 12.3 g. of potassium carbonate in 88 ml. of water. The butanol is removed from the deep yellow solution by concentration in vacuo and 2.8 g. of potassium ferricyanide in 35 ml. of water is then added dropwise to the residual aqueous solution over a 5 minute period. A heavy cream colored precipitate forms. After stirring for 15 minutes at room temperature about 20 ml. of water is added and the resulting mixture extracted with 2 x 20 ml. of ethyl acetate. The organic extracts are combined, washed with cold dilute sodium hydroxide and sodium chloride solution, and dried over magnesium sulfate. The solution is then concentrated to dryness in vacuo and the residue thus obtained crystallizes from a mixture of acetone and ether to give substantially pure 7-fluoro-4,6,2'-trimethoxy-6'-methyl-gris-2',5'-diene-3,4'-dione, M.P. 222–225° C.

A solution of 465 mg. of the product obtained immediately above in 50 ml. of 1,2-dimethoxy ethane is added to a stirred suspension of 900 mg. of 10% palladium on charcoal catalyst in 25 ml. of 1,2-dimethoxy ethane in a hydrogen atmosphere. The reaction is allowed to proceed until 0.9 equivalent of hydrogen is absorbed. This requires about 5 minutes. The hydrogenation is then stopped, the catalyst removed by filtration and the solvent removed by concentration in vacuo. The residue thus obtained is dissolved in 20 ml. of acetic acid and stirred with 800 mg. of zinc dust for 10 minutes. The zinc is then removed by filtration, 15 ml. of water added and the mixture extracted with 2 x 20 ml. of chloroform. The chloroform extracts are washed with dilute sodium hydroxide solution, with sodium chloride solution, and then dried over magnesium sulfate. The solvent solution is finally concentrated to dryness to give a colorless residue. This residue is dissolved in a small volume of chloroform and chromatographed on a column containing 26 g. of activated alumina. Elution of the column with benzene-chloroform yields 7-fluoro-4,6,2'-trimethoxy-6'-methyl-gris-2'-ene-3,4'-dione which is purified from acetone-ether, M.P. 209–211° C.

EXAMPLE 10

*5-Chloro-4,6,2'-Trimethoxy-6'-Methyl-Gris-2',5'-Diene-3,4'-Dione*

When 2,4'-dihydroxy-5-chloro-4,6,2'-trimethoxy-6'-methylbenzophenone is treated with potassium ferricyanide in potassium carbonate by the procedure set forth for the fluoro compound in Example 9, there is obtained 5-chloro-4,6,2'-trimethoxy-6'-methyl-gris-2',5'-diene-3,4'-dione, M.P. 204–207° C. Treatment of this latter material with hydrogen in the presence of a palladium catalyst as set forth in Example 9 yields 5-chloro-4,6,2'-trimethoxy-6'-methyl-gris-2'-ene-3,4-dione, M.P. 213–214° C.

When 2,4'-dihydroxy-3,5-dichloro-4,6,2'-trimethoxy-6'-methylbenzophenone is treated with potassium ferricyanide and potassium carbonate by the method of Example 9, and the resulting 5,7-dichloro-4,6,2'-trimethoxy-6'-methyl-gris-2',5'-diene-3,4'-dione reacted with hydrogen in the presence of palladium, also by the method of Example 9, there is produced 5,7-dichloro-4,6,2'-trimethoxy-6'-methyl-gris-2'-ene-3,4'-dione (5-chloro griseofulvin).

EXAMPLE 11

The fluorophenols of Formula I above (where at least one of R and $R_2$ is fluoro) may be obtained as described below.

A. *2-fluoro-3,5-dimethoxyphenol; 4-fluoro-3,5-dimethoxyphenol.*—A solution of 50 g. of phloroglucinol dimethyl ether in 400 ml. of pyridine is flushed with nitrogen by passing a stream of nitrogen through the solution for 5 minutes. The solution is then chilled to about 5° C. and perchloryl fluoride bubbled slowly through the solution. The mixture is allowed to warm to 25° C. and the slow addition of perchloryl fluoride (about one bubble per second) continued for 28 hours. The reaction mixture is then flushed with nitrogen and concentrated in vacuo to a syrup. 200 ml. of water is added to the syrup followed by sufficient cold 2.5 N hydrochloric acid to make the mixture acidic. The resulting yellow precipitate is recovered by filtration, washed with water and air dried. It consists essentially of a 1:1 mixture of $\Delta^{2,4}$-6,6-difluoro-3,5-dimethoxy-cyclohexadiene-1-one and $\Delta^{2,5}$-4,4-difluoro-3,5-dimethoxy-cyclohexadiene-1-one, M.P. 80–115° C. These cyclohexadieneones are separated and obtained substantially pure by fractional crystallization from ether and finally from an acetone-ether mixture. The $\Delta^{2,5}$-cyclohexadieneone is less soluble than the $\Delta^{2,4}$-cyclohexadieneone. After purification by crystallization from ether and acetone-ether $\Delta^{2,4}$-6,6-difluoro-3,5-dimethoxy-cyclohexadiene-1-one has M.P. 105–107° C., and $\Delta^{2,5}$-4,4-difluoro-3,5-dimethoxy-cyclohexadiene-1-one has M.P. 146–48° C.

29 g. of the 1:1 mixture of cyclohexadieneones obtained as described in the preceding paragraph is added to 150 ml. of acetic acid. The solution is chilled to 10° C. and 30 g. of zinc dust added to it. The resulting mixture is tirred vigorously for 1 hour at 10–15° C. and then filtered. The solids are washed with 30 ml. of ether and 30 ml. of water, and the washings added to the filtrate. The filtrate is extracted with 3 x 100 ml. of ether. The ether extracts are combined, washed with cold dilute sodium hydroxide solution and dried over magnesium sulfate. The drying agent is then removed by filtration and the ether solution concentrated to dryness in vacuo to give 26 g. of a red oil. This oil is steam distilled and the distillate (about 15 liters) treated with sodium chloride and extracted with 3 x 5 liters of ether. The ether extracts are combined and concentrated to dryness to give about 12 g. of a pale yellow oil. This oil is crystallized from ether-petroleum ether to give substantially pure 2-fluoro-3,5-dimethoxyphenol, M.P. 68–70° C. The nonvolatile residue from the steam distillation crystallizes slowly upon standing in the cold to give substantially pure 4-fluoro-3,5-dimethoxyphenol, M.P. 70–73° C.

B. *2-fluoro-3,5-dimethoxyphenol; 2-chloro-4-fluoro-3,5-dimethoxyphenol.*—60 g. of 2-chloro-3,5-dimethoxyphenol in 500 ml. of pyridine is treated with perchloryl fluoride as described in Example 7A. The solid obtained upon completion of the reaction, removal of the pyridine, and acidification of an aqueous solution of the pyridine residue (the isolation procedure of Example 7A) consists of a mixture of $\Delta^{2,4}$-6-chloro-6-fluoro-3,5-dimethoxy-cyclohexadiene-1-one and $\Delta^{2,5}$-4,4-difluoro-6-chloro-3,5-dimethoxy-cyclohexadiene-1-one. These products are separated by fractional crystallization from ether and acetone-ether as described in Example 7A to give $\Delta^{2,4}$-6-chloro-6-fluoro-3,5-dimethoxy-cyclohexadiene-1-one, M.P. 100–102° C., and $\Delta^{2,5}$-4,4-difluoro-6-chloro-3,5-dimethoxy-cyclohexadiene-1-one, M.P. 197–99° C. The $\Delta^{2,4}$-6-chloro-6-fluorodieneone is the less soluble of the two products. Treatment of the pure cyclohexadieneones with zinc dust as described in the second paragraph of Example 7A and extraction of the reaction mixture with ether (as described above) affords an oil on removal of the ether in vacuo. This oil is triturated with ether to give crystalline 2-fluoro-3,5-dimethoxyphenol and 2-chloro-4-fluoro-3,5-dimethoxyphenol, respectively.

C. *2-fluoro-4-chloro-3,5-dimethoxyphenol; 4-fluoro-3,5-dimethoxyphenol.*—When 4-chloro-3,5-dimethoxyphenol is treated with perchloryl fluoride as described in Part B above, there is obtained a mixture of $\Delta^{2,4}$-4-chloro-6,6-difluoro-3,5-dimethoxy-cyclohexadiene-1-one and $\Delta^{2,5}$-4-chloro-4-fluoro-3,5-dimethoxy-cyclo-hexadiene-1-one. Separation of this mixture by fractional crystallization and treatment of the separated products with zinc as described above yields 2-fluoro-4-chloro-3,5-dimethoxyphenol and 4-fluoro-3,5-dimethoxyphenol.

Any departure from the above description which conforms to the present invention is intended to be included within the scope of the claims.

What is claimed is:

1. The process that comprises treating 7-chloro-4,6,2'-trimethoxy-6'-methyl-gris-2,5'-diene-3,4'-dione with hydrogen in the presence of paladium catalyst and in a non-hydroxylic solvent medium thereby forming racemic griseofulvin, and recovering said racemic griseofulvin from the reaction mixture.

2. The process for preparing griseofulvin that comprises treating a non-hydroxylic organic solvent solution of 7 - chloro-4,6,2'-trimethoxy-6'-methyl-gris-2',5'-diene-3,4'-dione with hydrogen in the presence of palladium catalyst, continuing such treatment until one mole of hydrogen per mole of 7-chloro-4,6,2'-trimethoxy-6'-methyl-gris-2',5'-diene-3,4'-dione is absorbed, and recovering racemic griseofulvin from the hydrogenation reaction mixture.

3. The process that comprises treating a compound of the formula

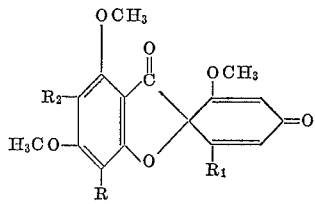

with hydrogen in the presence of palladium catalyst and in a non-hydroxylic solvent medium, thereby producing a compound of the formula

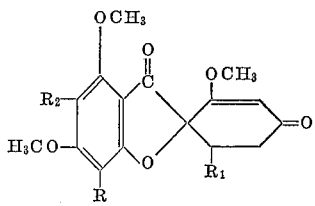

and recovering said latter compound from the reaction mixture, where R and $R_2$ are selected from the class consisting of hydrogen and halogen, and $R_1$ is selected from the class consisting of hydrogen and lower alkyl groups.

4. The process for preparing 7-fluoro-4,6,2'-trimethoxy-6'-methyl-gris-2'-ene-3,4'-dione of the formula

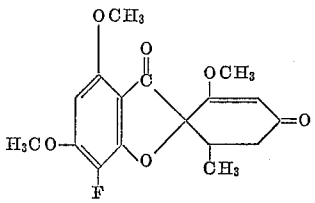

that comprises treating 7-fluoro-4,6,2'-trimethoxy-6'-methyl-gris-2',5'-diene-3,4'-dione of the formula

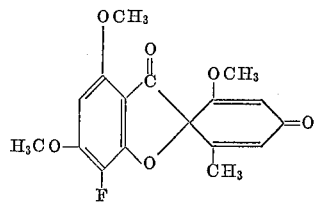

with hydrogen in the presence of palladium catalyst in a non-hydroxylic solvent medium.

5. The process for preparing 7-chloro-4,6,2'-trimethoxy-gris-2'-ene-3,4'-dione of the formula

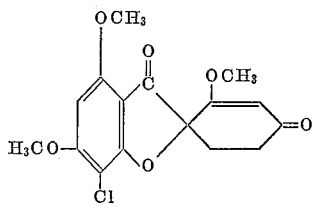

that comprises treating 7-chloro-4,6,2'-trimethoxy-gris-2',5'-diene-3,4'-dione of the formula

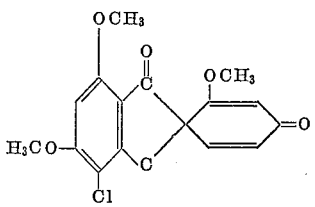

with hydrogen in the presence of palladium catalyst in a non-hydroxylic solvent medium.

6. The process for preparing 5-halo-4,6,2'-trimethoxy-6'-methyl-gris-2'-ene-3,4'-dione that comprises treating 5 - halo-4,6,2'-trimethoxy-6'-methyl-gris-2',5'-diene-3,4'-dione with hydrogen in the presence of palladium catalyst in a non-hydroxylic solvent medium.

References Cited in the file of this patent
UNITED STATES PATENTS
3,090,791    Brossi et al. _____ May 21, 1963

OTHER REFERENCES

Mulholland: J. Chem. Soc., London (1952), pages 3990–1.

MacMillan: J. Chem. Soc., London (1954), pages 2585–7.